United States Patent
Lee

(10) Patent No.: US 8,415,267 B2
(45) Date of Patent: Apr. 9, 2013

(54) NANOPARTICLES INCLUDING METAL OXIDE HAVING CATALYTIC ACTIVITY

(75) Inventor: Kwangyeol Lee, Gyeongkido (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 13/488,177

(22) Filed: Jun. 4, 2012

(65) Prior Publication Data
US 2012/0238442 A1    Sep. 20, 2012

Related U.S. Application Data

(62) Division of application No. 12/199,685, filed on Aug. 27, 2008, now Pat. No. 8,216,961.

(51) Int. Cl.
| B01J 23/00 | (2006.01) |
| B01J 21/00 | (2006.01) |
| B01J 37/00 | (2006.01) |
| B01J 20/00 | (2006.01) |
| B01J 29/00 | (2006.01) |

(52) U.S. Cl.
USPC ........... 502/242; 502/240; 502/241; 502/243; 502/244; 502/245; 502/246; 502/247; 502/248; 502/249; 502/250; 502/251; 502/252; 502/253; 502/254; 502/255; 502/256; 502/257; 502/258; 502/259; 502/260; 502/261; 502/262; 502/263; 502/300; 502/302; 502/303; 502/304; 502/439; 977/773; 977/775

(58) Field of Classification Search .......... 502/240–263, 502/300–355, 407, 415, 439; 977/773, 775
See application file for complete search history.

(56) References Cited

U.S. PATENT DOCUMENTS

| 4,601,669 | A  | 7/1986  | Hsieh |
| 5,023,139 | A  | 6/1991  | Birnboim et al. |
| 6,548,264 | B1 | 4/2003  | Tan et al. |
| 6,592,842 | B2 | 7/2003  | Elder et al. |
| 6,685,909 | B2 | 2/2004  | Elder et al. |
| 6,913,825 | B2 | 7/2005  | Ostafin et al. |
| 7,090,868 | B2 | 8/2006  | Gower et al. |
| 7,229,690 | B2 | 6/2007  | Chan et al. |
| 7,361,626 | B2 | 4/2008  | Baijense et al. |
| 7,381,465 | B2 | 6/2008  | Torimoto et al. |
| 7,449,237 | B2 | 11/2008 | Chan et al. |
| 7,485,367 | B2 | 2/2009  | Chen et al. |
| 7,659,224 | B2 | 2/2010  | Shimazaki et al. |
| 7,670,679 | B2 | 3/2010  | Krishna et al. |
| 7,820,291 | B2 | 10/2010 | Kim et al. |
| 7,875,351 | B2 | 1/2011  | Alivisatos et al. |
| 7,902,104 | B2 | 3/2011  | Kalck et al. |

(Continued)

FOREIGN PATENT DOCUMENTS

JP    2001-269573    10/2001

OTHER PUBLICATIONS

Chen et al. 2004, One-Step synthesis of FePt nanoparticles with tunable size, *J. Am. Chem. Soc.* 126(27):8394-8395.

(Continued)

*Primary Examiner* — Cam N. Nguyen
(74) *Attorney, Agent, or Firm* — Knobbe, Martens, Olson & Bear LLP

(57) ABSTRACT

Core-shell nanoparticles having a core material and a mesoporous silica shell, and a method for manufacturing the core-shell nanoparticles are provided.

20 Claims, 2 Drawing Sheets

U.S. PATENT DOCUMENTS

| | | |
|---|---|---|
| 2003/0157330 A1 | 8/2003 | Ostafin et al. |
| 2004/0245496 A1 | 12/2004 | Taoda |
| 2006/0019098 A1 | 1/2006 | Chan et al. |
| 2006/0114960 A1 | 6/2006 | Snee et al. |
| 2006/0118757 A1 | 6/2006 | Klimov et al. |
| 2006/0120941 A1 | 6/2006 | Chen et al. |
| 2007/0212538 A1 | 9/2007 | Niu |
| 2007/0212541 A1 | 9/2007 | Tsukada et al. |
| 2007/0243382 A1 | 10/2007 | Chan et al. |
| 2008/0095852 A1 | 4/2008 | Kong et al. |
| 2008/0153975 A1 | 6/2008 | Lubnin |
| 2008/0204742 A1 | 8/2008 | Halas et al. |
| 2008/0206562 A1 | 8/2008 | Stucky et al. |
| 2008/0220255 A1 | 9/2008 | Chen et al. |
| 2008/0241266 A1 | 10/2008 | Bringley et al. |
| 2008/0241516 A1 | 10/2008 | Hong et al. |
| 2009/0162643 A1 | 6/2009 | Dubrow et al. |
| 2009/0169866 A1 | 7/2009 | Ostafin et al. |
| 2009/0236583 A1 | 9/2009 | Kuo et al. |
| 2009/0297448 A1 | 12/2009 | Yan et al. |
| 2009/0311556 A1 | 12/2009 | Ganapathiraman et al. |
| 2010/0009338 A1 | 1/2010 | Zhang et al. |
| 2010/0108604 A1 | 5/2010 | Aerts et al. |
| 2010/0243020 A1 | 9/2010 | Norton et al. |
| 2010/0249271 A1 | 9/2010 | Matyjaszewski et al. |
| 2010/0258759 A1 | 10/2010 | Archer et al. |

OTHER PUBLICATIONS

Enache et al. 2006, Solvent-free oxidation of primary alcohols to aldehydes using Au-Pd/TiO$_2$ catalysts, *Science* 311:362-365.

Fu et al. 2003, Active nonmetallic Au and Pt species on ceria-based water-gas shift catalysts, *Science* 301:935-938.

Hosokawa et al. 2007, "Nanoparticle Technology Handbook", Elsevier, 94-100.

Kim et al. 2007, IR spectroscopic observation of molecular transport through Pt@CoO yolk-shell nanostructures, *J. Am. Chem. Soc.* 129(30):9510-9513.

Jun et al. 2003, Surfactant-assisted elimination of a high energy facet as a means of controlling the shapes of TiO$_2$ nanocrystals, *J. Am. Chem. Soc.* 125(51):15981-15985.

Lee et al. 2006, Synthesis and magnetic properties of silica-coated FePt nanocrystals, *J. Phys. Chem. B* 110(23)11160-11166.

Oshima et al. 1992, Preparation and microstructure of ZnO fine particles by ultrasonic spray pyrolysis method, *Kagaku Kogaku Ronbunshu*, 18(3):288-295.

Rodriguez et al. 2007, Activity of CeO$_x$ and TiO$_x$ nanoparticles grown on Au(111) in the water-gas shift reaction, *Science* 318:1757-1760.

Teng et al. 2003, Platinum-maghemite core-shell nanoparticles using a sequential synthesis, *Nano Letters* 3(2):261-274.

Teng et al. 2003, Synthesis of face-centered tetragonal FePt nanoparticles and granular films from Pt@Fe$_2$O$_3$ core-shell nanoparticles, *J. Am. Chem. Soc.* 125(47):14559-14563.

Han, Sangjin et al., Low-Temperature Synthesis of Highly Crystalline TiO$_2$ Nanocrystals and Their Application to Photocatalysis; *Small*, vol. 1, No. 8-9, pp. 812-816, 2005.

Kim, Young Hee et al., Preparation of Polycarbosilane Using a Catalytic Process; *Azojomo Journal of Materials Online*, vol. 1, pp. 1-7, Sep. 2005.

Lee, Jinwoo et al., Simple Synthesis of Functionalized Superparamagnetic Magnetite/Silica Core/Shell nanoparticles and Their Application as Magnetically Separable High-Performance Biocatalysts; *Small*, vol. 4, No. 1, pp. 143-152, 2008.

Li, Dan et al., Direct Fabrication of Composite and Ceramic Hollow Nanofibers by Electrospinning; *Nano Letters*, vol. 4, No. 5, pp. 933-938, Mar. 13, 2004.

Palani, Arudra et al., Selective Enrichment of Cysteine-Containing Peptides Using SPDP-Functionalized Superparamagnetic Fe$_3$O$_4$@SiO$_2$ Nanoparticles: Application to Comprehensive Proteomic Profiling; *Journal of Proteome Research*, pp. A-F, Jun. 19, 2008.

Takeda, Michio et al., Properties of Polycarbosilane-Derived Silicon Carbide Fibers with Various C/Si Compositions; *Composites Science and Technology*, vol. 59, pp. 787-792, Jan. 7, 1999.

Wang, Geng et al., V-Shaped Tin Oxide Nanostructures Featuring a Broad Photocurrent Signal : An Effective Visible-Light Driven Photocatalyst; *Small*, vol. 2, No. 12, pp. 1436-1439, 2006.

Wang, Yuliang et al., A Solution-Phase, Precursor Route to Polycrystalline SnO$_2$ Nanowires that Can be Used for Gas Sensing Under Ambient Conditions; *JACS Communications*, vol. 125, pp. 16176-16177, 2003.

Wung, Lee Jun, *Syntheiss of Nanostructured Ceramics by Electrospinning*, Korea Institute of Science and Technology Information.

NANOPARTICLES INCLUDING METAL OXIDE HAVING CATALYTIC ACTIVITY

A. CROSS-REFERENCE TO RELATED APPLICATIONS

This application is a divisional of U.S. application Ser. No. 12/199,685, filed Aug. 27, 2008, which is hereby incorporated by reference in its entirety.

B. TECHNICAL FIELD

The present disclosure relates generally to nanoparticles and, more particularly, to nanoparticles including metal oxide having catalytic activity.

C. BACKGROUND

Nanotechnology may provide nanoparticles having various sizes, compositions, and shapes. For materials having catalytic activity, such as metal oxide, metal/metal oxide composites, and the like, nanoparticles may have useful characteristics compared to particles having a larger size.

Meanwhile, according to J. A. Rodriguez et. al., *Science*, Vol 318, pp. 1757-1760, 2007, which is incorporated herein by reference, pure Au(111) does not show catalytic activity to water-gas shift reaction (WGS) ($CO+H_2O \rightarrow CO_2+H_2$); however, in the case of coating the surface of gold in the degree of 20 to 30% with metal oxide nanoparticles such as ceria or titania, the activity thereof corresponds to that of good WGS catalyst such as copper(111) or copper(100). Further, according to Maria Flytzani-Stephanopoulos et al., *Science*, Vol 301, pp. 935-938, 2003, incorporated herein by reference, as a WGS catalyst, the activity for ceria-based Au and Pt is mentioned. In another example, according to Graham J. Hutchings et al., *Science*, Vol 311, pp. 362-365, 2006, incorporated herein by reference, during the solvent-free oxidation of a primary alcohol to aldehyde, Au—Pd(alloy)/$TiO_2$ catalyst may be used. Au—Pd(alloy)/$TiO_2$ may maintain high selectivity for benzaldehyde at a high conversion rate, which may not be observed in pure Au catalyst or pure Pt catalyst.

However, in using the catalysts, there may be problems to be solved, such as agglomeration of the particles.

D. BRIEF DESCRIPTION OF THE DRAWINGS

FIG. 1. is a flow chart of an illustrative embodiment of a method for preparing nanoparticles.

E. DETAILED DESCRIPTION

Figure 1:
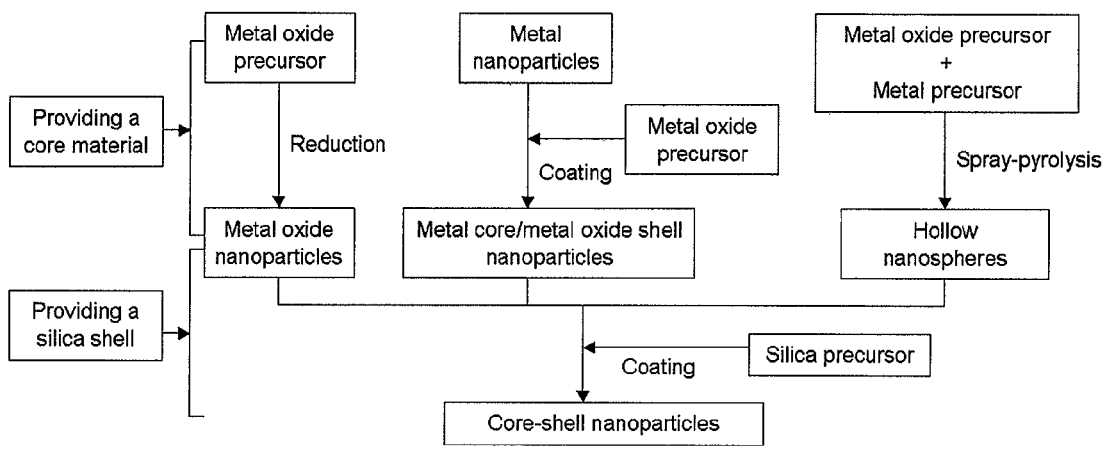

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure, as generally described herein, and illustrated in the Figures, may be arranged, substituted, combined, and designed in a wide variety of different configurations, all of which are explicitly contemplated and make part of this disclosure.

In one embodiment, a method for preparing core-shell nanoparticles may include providing a core material including a metal oxide having catalytic activity, and coating a surface of the metal oxide with silica to form the core-shell nanoparticles, where the core-shell nanoparticles includes a mesoporous shell.

In another embodiment, a core-shell nanoparticle may include a core material, and a mesoporous silica shell, where the core material includes a metal oxide having catalytic activity.

As shown in FIG. 1, core materials may include various types of nanoparticles, such as metal oxide nanoparticles, core-shell nanoparticles having a metal core and a metal oxide shell, hollow nanospheres having a metal oxide and a cavity, and the like. Such core materials may be coated with a silica shell to form core-shell nanoparticles.

Figure 2:
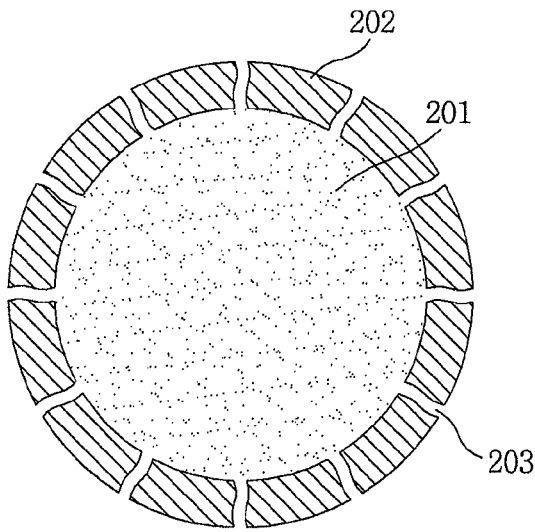
FIG. 2 is a schematic diagram of an illustrative embodiment of nanoparticles including metal oxide.

Referring to FIG. 2, in one embodiment, a core-shell nanoparticle may include a core material 201, and a mesoporous silica shell 202 having a pore channel 203, where the core material includes a metal oxide.

Figure 3:
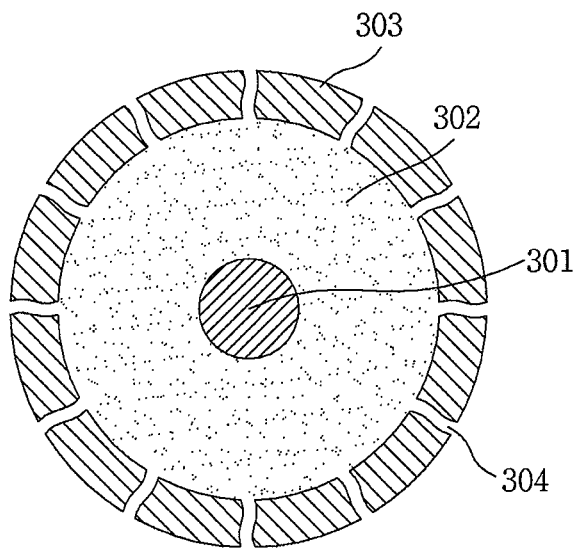
FIG. 3 is a schematic diagram of an illustrative embodiment of core-shell nanoparticles.

Referring to FIG. 3 in another embodiment, a core-shell nanoparticle may include a core material, and a mesoporous silica shell 303 having a pore channel 304, where the core material includes a metal core 301 and a metal oxide shell 302.

Figure 4:
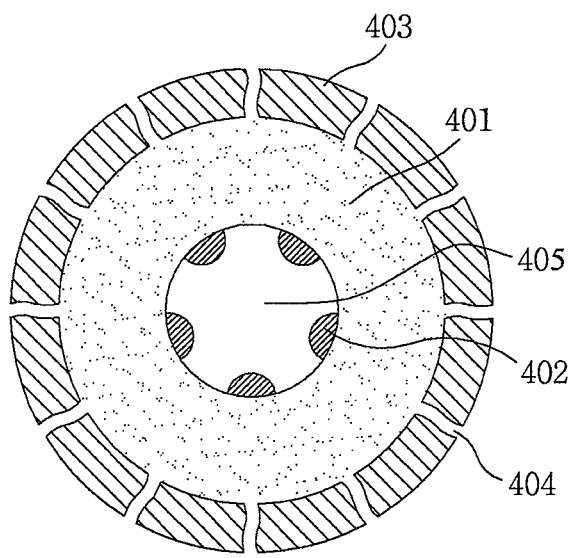
FIG. 4 is a schematic diagram of an illustrative embodiment of hollow nanospheres.

Referring FIG. 4 in another embodiment, a core-shell nanoparticle may include a hollow nanosphere as a core material having a metal oxide layer 401 and a cavity 405, and a mesoporous silica shell 403 having a pore channel 404. In yet other embodiment, a metal 402 may be attached to an inner surface of the hollow nanosphere.

a. Providing Core Nanoparticles

In various embodiments, the average size of the core nanoparticles having catalytic activity may have a range from about 5 nm to about 100 nm, or 5 nm to about 50 nm.

In one embodiment, the nanoparticles having catalytic activity may include metal oxide having catalytic activity for a variety of chemical reactions, such as, for example, an oxidation reaction. The metal oxide may include an oxide of, for example, Al, Ti, V, Mn, Fe, Co, Ni, Cu, Zn, Ga, Y, Zr, Sn, Ce or numerous types of lanthanoids. In some examples, the metal oxide having catalytic activity may be, for example, $TiO_2$ (including anatase-type, rutile-type and the like), $CeO_2$, $V_2O_3$, ZnO, $ZrO_2$, $SnO_2$, $WO_3$, $Fe_2O_3$, $V_2O_2$, $MoO_3$ and the like.

In some embodiments, the metal oxide may include an oxide of one metal element. In other embodiments, the metal oxide may include an oxide of two or more metal elements. The metal oxide may be in the form of a complex metal oxide having two or more metal oxides (for example, perovskite $SrTiO_3$), or in a doped form within the phase having a main component of any one. In other embodiments, numerous materials capable of acting as a catalyst, such as, but not limited to, sulfides and chlorides, may be used together with metal oxide components, and accordingly the claimed subject matter is not limited in these respects.

The metal oxide nanoparticles may be prepared by any of a variety of known methods. In one embodiment, the metal oxide nanoparticles may be prepared from a metal oxide precursor according to a gas phase method, a liquid phase method, or a solid phase method. In other embodiments, a sol-gel process, hydrothermal process, microemulsion synthesis, or the like, may be used, and accordingly, the claimed subject matter is not limited in this respect.

In one embodiment, a sol-gel process may use a catalyst (for example, an acid or ammonia) dissolved in a solvent, and a metal oxide precursor dissolved in the solution. A compound in the form of sol may be formed through hydrolysis and condensation, the compound may be grown into the gel phase, and, upon drying the compound, a metal oxide may be obtained. During the reaction, other additives such as stabilizers, surfactants and the like may be added.

In various examples, solvents may include a solvent such as, but not limited to, water, alcohol (for example, methanol, ethanol, propanol, butanol, methoxyethanol, and the like), or ether. In some examples, precursors may include a compound such as, but not limited to, metal alkoxide, metal acetylacetonate; acac, metal halide, metal carbonyl compound, metal salts of metals such as Al, Ti, V, Mn, Fe, Co, Ni, Cu, Zn, Ga, Y, Zr, Sn, Ce or numerous types of lanthanoids.

In some embodiments, the composition, size, structure, or shape of the nanoparticles may be adjusted varying the concentration and type of reactant, surfactant, stabilizer, solvent, etc., and the reaction conditions (reaction temperature, heating rate, pH and so on). For example, the size of the nanoparticles may be adjusted by adjusting the concentration of the used metal oxide precursor and its mole ratio, and the shape of the nanoparticles may be adjusted according to pH and the type of a reducing agent. It should be appreciated that one skilled in the art, in light of the present disclosure, may prepare the nanoparticles having the desired composition, size, structure, shape and the like by properly adjusting such conditions.

In another embodiment, the nanoparticles having catalytic activity may include core-shell nanoparticles having a metal core and a metal oxide shell. The core-shell nanoparticles may include a metal such as, but not limited to, Mn, Fe, Co, Ni, Cu, Zn, Ru, Rh, Pd, Ag, In, Sn, Re, Os, Ir, Pt, Au, or lanthanoids, or an alloy of two or more of them, as the metal core. Further, the core-shell nanoparticles may include numerous metal oxides as discussed above as the metal oxide. The metal element included in the metal core and the metal oxide shell may be the same, or may be different.

In one embodiment, the average diameter of the metal core may have a range from about 1 nm to about 50 nm, or about 1 nm to about 25 nm.

The nanoparticles including the metal core-metal oxide shell may obtain improved performance, for example, increase of catalytic activity and selectivity compared to catalytic nanoparticles including only metal core components or metal oxide shell components.

The nanoparticles including such a metal core-metal oxide shell configuration may be prepared according to any of a variety of known methods. In some embodiments, the metal oxide shell may be formed on the surface of a metal core by dispersing the metal nanoparticles in a solution in the presence of stabilizer, surfactant and the like, and adding a metal oxide precursor to be decomposed or reduced by heating and/or oxidizing, and accordingly, the claimed subject matter is not to be limited in this respect.

In another embodiment, the nanoparticles having catalytic activity may include hollow nanospheres of metal oxide having mesoporous walls. Such nanospheres may include any of a variety of metal oxides as discussed above. In some embodiments, the hollow nanospheres may include a metal attached to an inner surface of the nanospheres. In one embodiment, a metal may include a noble metal such as Cu, Ag, Au, Ni, Pt, Pd, etc. The metal may improve catalytic activity of metal oxide.

In an illustrative embodiment, hollow nanospheres may be prepared according to any of a variety of known methods. In some embodiments, a pyrolysis-spray method may be used. In one example, the pyrolysis-spray method may include preparing a solution where a metal oxide precursor is dissolved in the form of a salt, preparing an aerosol in the form of droplets by spraying the solution with an ultrasonic vibrator or the like, and introducing the solution into a reactor of high temperature by using a carrier gas. The droplet introduced by the carrier gas may be heated by heat transferred from a high temperature reactor, the solvent in the droplet may be evaporated, the reactant may be pyrolyzed to obtain hollow nanospheres, and accordingly, the claimed subject matter is not limited in this respect.

In one embodiment, a metal oxide may be formed on the surface of the nano-sized droplet during the process of the metal oxide precursor being pyrolyzed, and the hollow-type nanospheres may be obtained, depending on the pyrolysis temperature, concentration of precursor, type of solvent, and other process parameters.

In another embodiment, using an organic material (polymer nanoparticle) removable by being pyrolyzed above a specific temperature, the hollow-type nanospheres may be obtained by a method of forming a layer of metal oxide on the surface of the organic material and removing the organic material by pyrolysis.

In some embodiments, two or more metal oxide precursors may be used in the sprayed solution, and a complex metal oxide having two or more metal oxide components may be formed. In one embodiment, the metal component may be also an alloy of two or more metals. In other embodiments, a precursor of a metal component that is not oxidized well (for example, the type of precious metal such as Pt, Pd, Au, Ag, Cu, Ni and the like) may be used, and hollow spheres may be prepared such that the metal is attached onto an inner surface of the hollow nanospheres. The hollow spheres may have performance characteristics including, but not limited to, an increase of catalytic activity, increased selectivity, and the like by preparing the hollow nanospheres having the component of metal or metal oxide as discussed above.

In one illustrative embodiment, a stabilizing agent may include functional organic molecules such as surfactants, amphiphilic polymers, etc. as described below, although claimed subject matter is not limited to specific stabilizing agents or to the use of stabilizing agents in the reduction reaction.

Providing a Silica Shell

In one embodiment, core-shell nanoparticles having silica shells may be formed by providing silica on the surface of the nanoparticles having catalytic activity as discussed, and forming a mesoporous silica shell. In some embodiments, a mesoporous silica shell may have a structure where an average diameter of pore channels in the silica shell is about 3 nm or less, or about 3 nm or less. In other embodiments, a mesoporous silica shell may have a structure where a specific surface area is about 200 $m^2$/g to about 3000 $m^2$/g.

In various embodiments, the average size of the core-shell nanoparticles may have a range from about 10 nm to about 200 nm, or from about 10 nm to about 100 nm.

In one embodiment, the silica shell may be provided by a liquid phase method such as a sol-gel process, a microemulsion synthesis process, or the like.

In an illustrative embodiment, the nanoparticles dispersion solution surrounded by surfactant may be obtained by dispersing the nanoparticles including a metal oxide in a solution with a dissolved surfactant. In some examples a stabilizer may also be added to the solution. A catalyst which may induce a hydroxyl group to a precursor molecules (for example, ammonia water solution, sodium hydroxide, potassium hydroxide, calcium hydroxide), may be further added to said solution. In some embodiments, the nanoparticles may be uniformly dispersed in the solution using sonication.

In one embodiment, the mesoporous silica shell may be formed on the surface of the nanoparticles including said metal oxide by putting a silica precursor into the prepared dispersion solution. The added precursor molecules may grow into a silica coating layer by surrounding the ambient of the nanoparticles and combining with each other. A silica coating layer in the form of a gel may be formed on the surface of the nanoparticles by the precursor molecules being combined with each other through a condensation such that hydroxyl ions may be dehydrated. Said reaction may be conducted at room temperature, or it may be heated at a temperature above room temperature, such as, but not limited to, about 150 degrees Celsius to about 300 degrees Celsius. In various embodiments, the thickness of the coated silica shell may be adjusted by differing silica precursors, solvents, concentration of the catalyst, their mole ratio, and other process parameters.

In some embodiments, the solvent may include such as, but not limited to, water, alcohol (for example, methanol, ethanol, propanol, butanol, pentanol and the like), ether (e.g., phenyl ether, octyl ether), dichlorobenzene.

In one embodiment, various silica precursor may be used that may obtain $SiO_2$. In one example, silicon alkoxide may be used. The example of silicon alkoxide may include a compound of the formula (I):

$$Si(OR^1)_4 \quad (I)$$

where the $R^1$ may be $C_1$-$C_6$ alkyl, alkenyl or aromatic group, substituted or unsubstituted with halogen atom. The silicon alkoxide may include, TEOS (tetraethyl orthosilicate), TMOS (tetramethyl orthosilicate), TBOS (tetrabutyl orthosilicate), or the like. Further, silica precursors may includes silicon halide (for example $SiCl_4$ (tetrachlorosilane) and the like), silicon salt (for example sodium silicate and the like), or the like.

In some embodiments, the surfactant may include a long-chain primary amine (for example alkyl amine ($RNH_2$, where R is alkyl group having at least 6 carbon atoms, for example oleylamine, octylamine, hexadecylamine, octadecylamine and the like), trialkylphosphine or trialkylphosphineoxide (for example trioctylphosphine oxide: TOPO, trioctylphosphine: TOP, tributylphosphine and the like)).

In other embodiment, a nonionic surfactant may include such as, but not limited to, polyoxyethylene-type nonionic surfactant, polyglycerin-type nonionic surfactant, sugar ester-type nonionic surfactant, or the like. They may be used in various combinations.

In some examples, a nonionic surfactant may include polyoxyethylene alkylether, polyoxyethylene alkylphenylether, polyoxyethylene•polyoxypropylene alkylether, polyoxyethylene fatty acid ester, polyoxyethylene sorbitan fatty acid ester, polyoxyethylene glycerin fatty acid ester, derivatives of polyoxyethylene castor oil or hydrogenated castor oil, derivatives of polyoxyethylene wax•lanolin, alkanol amid, polyoxyethylene propylene glycol fatty acid ester, polyoxyethylene alkylamin, polyoxyethylene fatty acid amid, sugar fatty acid ester, polyglycerin fatty acid ester, polyether modified silicon, or the like. In other examples, polyoxyethylene cholesterol ether or polyoxyethylene phytosterolether may be used. Each of the discussed examples may be used alone or various combinations of two or more of the examples.

In a polyoxyethylene-type nonionic surfactant, an alkyl group thereof may be an alkyl group of $C_6$~$C_{22}$ saturated or unsaturated fatty acid, for example, fatty acid of one of lauric acid, myristic acid, palmytic acid, stearic acid, oleic acid and the like, or an alkyl group of a mixed fatty acid or synthesized fatty acid (including branched fatty acid) such as those obtained from nature including, but not limited to palm oil fatty acids, beef tallow fatty acids, hydrogenated beef tallow fatty acids, castor oil fatty acids, olive oil fatty acids, or the like, may be used. In some examples, polyoxyethylene-type nonionic surfactant including, but not limited to, $C_{12}H_{25}(CH_2CH_2O)_{10}OH$ known as $C_{12}EO_{10}$ or 10 lauryl ether, $C_{16}H_{33}(CH_2CH_2O)_{10}OH$ known as $C_{16}EO_{10}$ or 10 cetyl ether, $C_{18}H_{37}(CH_2CH_2O)_{10}OH$ known as $C_{18}EO_{10}$ or 10 stearyl ether, $C_{12}H_{25}(CH_2CH_2O)_4OH$ known as $C_{12}EO_4$ or 4 lauryl ether, $C_{16}H_{33}(CH_2CH_2O)_2OH$ known as $C_{16}EO_2$ or 2 cetyl ether, or combinations thereof may be included. In one embodiment, polyoxyethylene(5)nonlyphenyl ether, named Igepal CO-520, may be used. Further, as the alkyl group, a fluoroalkyl group with hydrogen substituted to fluorine at a variety of ratios may be used. In a polyoxyethylene-type nonionic surfactant, the number of polyoxyethylene condensation of between 1 and 50 may be used.

In some examples, a nonionic surfactant such as, but not limited to, ethylene oxide/propylene oxide block copolymer may be used. In other examples, a block copolymer such as, but not limited to, a bi-block compound such as poly(ethylene oxide)-b-poly(propyleneoxide) or a tri-block compound such as poly(ethylene oxide)-poly(propylene oxide)-polyethylene oxide or poly(propylene oxide)-poly(ethylene oxide)-poly (propylene oxide) may be used. In other examples, a block copolymer surfactant such as, but not limited to, Pluronic® P123 [poly(ethylene oxide) -b-poly(propylene oxide)-b-poly (ethylene oxide), $EO_{20}PO_{70}EO_{20}$, P103, P85, L64, 10R5, F108, F98, 25R4, or 17R4 available from BASF Corporation may be used.

In some examples, a cationic surfactant may include a compound such as, but not limited to, a surfactant represented by the below formula (II) or (III):

$$C_aH_{2a+1}N(C_bH_{2b+1})_3X \quad (II)$$

$$N(C_mH_{2m+1})_4X \quad (III)$$

where a may be an integer between 8 and 25, b may be an integer 1 or 2, m may be an integer between 1 and 6, and X may be halogen.

Various examples of the cationic surfactants of formula (II) may include halogenated octadecyltrimethyl ammonium, halogenated hexadecyltrimethyl ammonium, halogenated tetradecyltrimethyl ammonium, halogenated dodecyltrimethyl ammonium, halogenated octadecyltriethyl ammonium, halogenated hexadecyltriethyl ammonium, halogenated tetradecyltriethyl ammonium, halogenated dodecyltriethyl ammonium and mixtures thereof. In some embodiment, a surfactant may include octadecyltrimethyl ammonium bromide (cetyltrimethyl ammonium bromide: CTAB), hexacetyltrimethyl ammonium bromide, tetradecyltrimethyl ammonium bromide, dodecyltrimethyl ammonium bromide, octadecyltriethyl ammonium bromide, hexadecyltriethyl ammonium bromide, tetradecyltriethyl ammonium bromide, or dodecyltriethyl ammonium bromide.

Various examples of the cationic surfactant of formula (III) may include halogenated tetramethyl ammonium, halogenated tetraethyl ammonium, halogenated tetrapropyl ammonium, or halogenated tetrabutyl ammonium, or mixtures thereof. In an embodiment, tetramethyl ammonium bromide (TMAB) may be used.

In other embodiments, nonionic or anionic surfactant may include alkyl thiol, sodium alkyl sulfate, or sodium alkyl phosphate.

In one illustrative embodiment, the size of a pore channel of a silica shell and/or the size of a cavity of a nanocapsule may be modified by partially etching the silica shell in the presence of a common basic buffer solution. In one embodiment, a buffer solution may be prepared from carbonic acid ($H_2CO_3$) and sodium bicarbonate ($NaHCO_3$) to maintain a pH from about 7.35 to about 7.45. Examples of other buffer solutions may include barbitone sodium/hydrochloric acid (buffering range at 25° C.: pH about 6.8-about 9.6), tris(hydroxylmethyl)aminomethane/hydrochloric acid (pH about 7.0-about 9.00), sodium tetraborate/hydrochloric acid (pH about 8.1-about 9.2), glycine/sodium hydroxide (about 8.6-about 10.6), sodium carbonate/sodium hydrogen carbonate (9.2-10.8), sodium tetraborate/sodium hydroxide (pH about 9.3-about 10.7), sodium bicarbonate/sodium hydroxide (pH about 9.60-about 11.0), sodium hydrogen orthophosphate/sodium hydroxide (pH about 11.0-about 11.9), potassium chloride/odium hydroxide (pH about 12.0-about 13.0). In other embodiment, etching may be carried out using an inorganic base such as NaOH or KOH. In another embodiment, etching may be carried out simultaneously with sound wave treatment, such as supersonic wave treatment. Such treatment may be carried out in base condition, i.e., in a pH higher than about 7, in some implementations about 7.5 to 10, in other implementations from 8 to 10. In some embodiments, such a treatment may be last for from about 2 to about 3 hours.

Coating the nanoparticles having catalytic activity with silica shell may provide various advantages. Interaction potential on the surface of silica shell may be adjusted and it may be dispersed in various solvents (polar, nonpolar, etc.) in the form of a colloid. Further, silica may generally be substantially chemically inactive and optically transparent, and silica may not affect the reaction of core materials. A physical obstacle covering the surface of the core nanoparticles may be formed, however that may be overcome by forming a mesoporous silica shell. In the case that the core nanoparticles act as a catalyst in various chemical reactions, the particles may be inhibited from agglomeration by being used during the process of regenerating the catalyst (for example, moving solid catalyst in a fluidized-bed reactor). In using the catalyst in substantially severe environments, catalytic activity of the core including the metal oxide may be substantially maintained, and process costs may be reduced by preventing frequent catalyst replacement. Further, without substantial agglomeration of the particles, the core-shell nanoparticles including silica shells may be used as a catalyst by pressing them in the form of a plate, sheet, or the like. In one example, they may be used in a catalytic converter of a vehicle.

The following example may explain certain characteristics of the present disclosure. However, the example is not meant to be limiting. In particular, one skilled in the art, in light of the present disclosure, will appreciate that various parts of compositions and constitutions disclosed herein may be modified, substituted, added or combined.

EXAMPLES

Example 1

Preparation of Titanium Oxide Nanoparticles

In an illustrative embodiment, $HNO_3$ (0.75~9.00 mL, 0.05~1.20 M) may be added to titanium bis(acetylacetonate) isopropoxide; TBADI; Aldrich, 75%, 4.86 g of 2-propanol) with stirring for 30 minutes in a flask of 100 mL. The resulting reaction mixture may be diluted with distilled water, and may be made to be 100 mL, and a solution with a Ti concentration of about 0.1 M may be produced. During the process of diluting water, the pH may be adjusted by using $HNO_3$. A precursor solution may be produced by further stirring the reaction mixture at room temperature for about 4 hours.

The produced precursor solution may be filled in pyrex; equipped in the inner Bomb; and pyrolyzed at a temperature of about 100 degrees Celsius to 300 degrees Celsius for about 4 to 12 hours. A suspension with dispersed $TiO_2$ may be obtained. The formed $TiO_2$ nanoparticles may be recovered by centrifugation at about 15000 rpm for about 20 minutes, and may be washed about three times with about 50 mL of water, twice with ethanol.

Example 2

Preparation of Nanoparticles with a Platinum-core and Iron Oxide-shell

In an illustrative embodiment, a mixture of hexadecanediol (90%, tech. grade, Aldrich, 0.2 g or 0.75 mmol), oleic acid (99+%, Aldrich, 40 microliters, or 0.125 mmol), and oleylamine (70%, tech, grade, Aldrich, 50 microliters, or 0.125 mmol) in octyl ether (99%, Aldrich, 1.5 mL) may be added to a three-neck round-bottom flask of 15 mL under argon stream, and may be heated to a temperature of 290 degrees Celsius using, for example, a heating mantle under reflux. Platinum acetylacetonate ($Pt(acac)_2$) (99.99%, Aldrich, 0.1 g or 0.25 mmol) in 1 mL of octyl ether may be poured into the mixture at about the same temperature. The color of the reaction solution may be changed to black, and a spontaneous formation of nanoparticles may result. For about 5 minutes, the reaction may be continued, and the solution may be cooled to a temperature of about 220 degrees Celsius. Iron pentacarbonyl; $Fe(CO)_5$ (99.999%, Aldrich, 0.5 mmol) may be added with, for example, a microsyringe, and the reaction temperature may be raised to about 290 degrees Celsius. After refluxing the solution at that temperature for a predetermined time period (for example, about 5 minutes to about 2 hours), the solution may be cooled to room temperature. The nanoparticles may be separated from the mixture by washing with hexane and ethanol, and they may be centrifuged under ambient conditions for about 5 minutes at about 5000 rpm. The product may be dispersed in hexane and a small amount of oleic acid The core-shell nanoparticles prepared using $Pt(acac)_2/Fe(CO)_5$, may be relatively monodispersed, and may have an average diameter of core crystalline facets of about 10 nm and an average thickness of the shell of about 3.5 nm. The diameter and thickness may be measured with image analysis of clear vision TEM (bright-field transmission electron microscopy). The core of the core-shell nanoparticles may include substantially Pt (which may be determined using, for example, spectrum analysis of Powder X-ray diffraction (PXRD)), and the shell may include substantially gamma-$Fe_2O_3$ (which may be determined using, for example, analysis of X-ray photoemission spectroscopy (XPS)).

Example 3

Preparation of TiO$_2$/Au(111) CeO$_2$/Au(111) Nanoparticles

In an illustrative embodiment, according to the method disclosed in J. A. Rodriguez et. al., *Science*, Vol 318, 2007, 1757-1760, TiO$_2$/Au(111), CeO$_2$/Au(111) and the like may be prepared.

Example 4

Preparation of Hollow Nanosphere of Metal Oxide Having Mesoporous Wall

In an illustrative embodiment, according to the method disclosed in K. Oshima, et. al, *Kagaku Kogaku Ronbunsyu*, 18(3), 288-295 (1992), incorporated herein by reference, ZnO hollow spheres may be prepared from an aqueous solution of a metal nitrate salt.

Example 5

Preparation of Silica Shell

In an illustrative embodiment, in an oil-in-water microemulsion, the core-shell nanoparticles obtained from examples 1 to 4 may be coated with SiO$_2$ by forming base catalytic-silica from tetraethylorthosilicate (TEOS).

Igepal CO-520 (8 mL, (C$_2$H$_4$O)$_n$.C$_{15}$H$_{24}$O, n~5, Aldrich) may be mixed with about 170 mL of cyclohexane (Aldrich) and may be stirred in an Erlenmeyer flask. After redispersing the nanoparticles obtained from examples 1 to 4 at a concentration of about 1 mg/mL among cyclohexane, 16 mg (about 60 mL) of dispersion solution may be added to the cyclohexane/Igepal solution. About 1.3 mL of water solution of 30% NH$_4$OH (EM Science) may be added dropwise, and may be stirred for about 2 to 3 minutes. About 1.5 mL of TEOS (98%, Aldrich) may be added, and nanoparticles with a shell thickness of SiO$_2$ of about 16 nm may be obtained. The nanoparticles may be collected by stirring the mixture for about 72 hours and by adding methanol. The particles may be deposited with hexane, and may be collected by centrifugation. The particles may be redispersed in ethanol. To eliminate excess surfactant, the nanoparticles coated with silica may be washed by repeating the above process, for example, three or more times. The product may obtained as an ethanol dispersion solution.

In another example, based on the desired thickness of silica shell, the core-shell nanoparticles may be obtained by adding nanoparticles of about 8 mg to 40 mg (about 8 mL to 40 mL) and TEOS of about 0.5 mL to 12 mL.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A core-shell nanoparticle comprising:
a core material comprising a metal core and a metal oxide shell, wherein the metal oxide shell has catalytic activity; and
a mesoporous silica layer at least partially encapsulating the core material, wherein the core-shell nanoparticle has a size from about 10 nm to about 200 nm.

2. The core-shell nanoparticle of claim 1, wherein the core material has a size from about 5 nm to about 100 nm.

3. The core-shell nanoparticle of claim 1, wherein the mesoporous silica layer comprises one or more pore channels.

4. The core-shell nanoparticle of claim 3, wherein the pore channels have an average size of about 3 nm or less.

5. The core-shell nanoparticle of claim 1, wherein the mesoporous silica layer is partially etched.

6. The core-shell nanoparticle of claim 1, wherein the mesoporous silica layer has a specific surface area of about 200 m$^2$/g to about 3000 m$^2$/g.

7. The core-shell nanoparticle of claim 1, wherein the metal oxide shell comprises at least one of TiO$_2$, CeO$_2$, V$_2$O$_3$, ZnO, ZrO$_2$, SnO$_2$, WO$_3$, Fe$_2$O$_3$, V$_2$O$_2$, or MoO$_3$.

8. The core-shell nanoparticle of claim 1, wherein the metal core comprises at least one of Mn, Fe, Co, Ni, Cu, Zn, Ru, Rh, Pd, Ag, In, Sn, Re, Os, Ir, Pt, Au, a lanthanoid, or alloys thereof.

9. The core-shell nanoparticle of claim 1, wherein the metal core has a size from about 1 nm to about 50 nm.

10. A core-shell nanoparticle comprising:
a hollow nanosphere comprising a metal oxide shell and a cavity, wherein the metal oxide shell has catalytic activity; and
a mesoporous silica layer at least partially encapsulating the hollow nanosphere, wherein the core-shell nanoparticle has a size from about 10 nm to about 200 nm.

11. The core-shell nanoparticle of claim 10, wherein the hollow nanosphere comprises a metal attached to an inner surface of the hollow nanosphere.

12. The core-shell nanoparticle of claim 10, wherein the metal attached to the inner surface of the hollow nanosphere comprises at least one of Cu, Ag, Au, Ni, Pt, or Pd.

13. The core-shell nanoparticle of claim 10, wherein the hollow nanosphere has a size from about 5 nm to about 100 nm.

14. The core-shell nanoparticle of claim 10, wherein the mesoporous silica layer comprises one or more pore channels.

15. The core-shell nanoparticle of claim 14, wherein the pore channels have an average size of about 3 nm or less.

16. The core-shell nanoparticle of claim 10, wherein the mesoporous silica layer is partially etched.

17. The core-shell nanoparticle of claim 10, wherein the mesoporous silica layer has a specific surface area of about 200 m$^2$/g to about 3000 m$^2$/g.

18. The core-shell nanoparticle of claim 10, wherein the metal oxide shell comprises at least one of TiO$_2$, CeO$_2$, V$_2$O$_3$, ZnO, ZrO$_2$, SnO$_2$, WO$_3$, Fe$_2$O$_3$, V$_2$O$_2$, or MoO$_3$.

19. A core-shell nanoparticle comprising:
a metal core comprising at least one of Mn, Fe, Co, Ni, Cu, Zn, Ru, Rh, Pd, Ag, In, Sn, Re, Os, Ir, Pt, Au, a lanthanoid, or alloys thereof;
a metal oxide layer at least partially encapsulating the metal core, wherein the metal oxide layer comprises at least one of TiO$_2$, CeO$_2$, V$_2$O$_3$, ZnO, ZrO$_2$, SnO$_2$, WO$_3$, Fe$_2$O$_3$, V$_2$O$_2$, or MoO$_3$; and
a mesoporous silica layer at least partially encapsulating the metal oxide layer.

20. The core-shell nanoparticle of claim 19, wherein the mesoporous silica layer is disposed at an outer surface of the core-shell nanoparticle.

* * * * *

UNITED STATES PATENT AND TRADEMARK OFFICE
CERTIFICATE OF CORRECTION

PATENT NO. : 8,415,267 B2  
APPLICATION NO. : 13/488177  
DATED : April 9, 2013  
INVENTOR(S) : Lee Page 1 of 1

It is certified that error appears in the above-identified patent and that said Letters Patent is hereby corrected as shown below:

On Title Page 2, in Item (56), under "OTHER PUBLICATIONS", in Column 2, Line 39, delete "Syntheiss" and insert -- Synthesis --, therefor.

In the Specifications:

In Column 1, Line 25, delete "Vol" and insert -- Vol. --, therefor at each occurrence throughout the specification.

In Column 1, Line 47, delete "FIG. 1." and insert -- FIG. 1 --, therefor.

In Column 5, Line 56, delete "polyoxyethylene•polyoxypropylene" and insert -- polyoxyethylene polyoxypropylene --, therefor.

In Column 5, Line 60, delete "wax•lanolin," and insert -- wax lanolin, --, therefor.

In Column 7, Line 21, delete "chloride/odium" and insert -- chloride/sodium --, therefor.

In Column 9, Line 17, delete "et. al," and insert -- et. al., --, therefor.

Signed and Sealed this  
Sixteenth Day of July, 2013

Teresa Stanek Rea  
*Acting Director of the United States Patent and Trademark Office*